US005742137A

United States Patent [19]

[11] Patent Number: 5,742,137

[45] Date of Patent: Apr. 21, 1998

Bratton et al.

[54] STARTER MOTOR CONTROL CIRCUIT AND METHOD

[75] Inventors: Harold D. Bratton, Graz, Austria; Frank O. Klegon, White Lake, Mich.; David C. Baker, Rochester, Mich.; Gary F. Kajdasz, Commerce Twp, Mich.; David M. Patasky, Sterling Heights, Mich.; Walter Wolfe, South Lyon, Mich.; James Lewandowski, Clinton Twp., Mich.; Robert E. Hojna, Franklin, Mich.

[73] Assignee: Chrysler Corporation, Auburn Hills, Mich.

[21] Appl. No.: 804,164

[22] Filed: Feb. 20, 1997

Related U.S. Application Data

[63] Continuation of Ser. No. 531,569, Sep. 5, 1995, which is a continuation of Ser. No. 270,344, Jul. 5, 1994, abandoned.

[51] Int. Cl.[6] .......... H02P 1/00

[52] U.S. Cl. .......... 318/139; 74/6; 123/179.3; 290/38 R

[58] Field of Search .......... 74/6, 7 R, 7 A, 74/7 B, 7 C, 7 D, 7 E, 8, 9; 290/38 R, 38 A, 38 B, 38 C, 38 D, 38 E; 123/179.1, 179.3, 179.28; 328/139, 4

[56] References Cited

U.S. PATENT DOCUMENTS

| | | | |
|---|---|---|---|
| 3,747,719 | 7/1973 | Ciolli | 74/6 |
| 3,798,977 | 3/1974 | Digby | 74/6 |
| 3,905,245 | 9/1975 | Mortensen | 74/6 |
| 3,935,749 | 2/1976 | Groves | 74/6 |
| 4,209,816 | 6/1980 | Hansen | 361/23 |
| 4,488,054 | 12/1984 | Ebihara | 290/38 A |
| 4,570,583 | 2/1986 | Hamano et al. | 123/179 A |
| 4,621,197 | 11/1986 | Tanaka | 290/38 R |
| 4,622,930 | 11/1986 | Hamano et al. | 123/179 K |
| 4,862,010 | 8/1989 | Yamamoto | 290/38 R |
| 5,035,151 | 7/1991 | Isozumi | 74/7 A |
| 5,097,715 | 3/1992 | Isozumi | 74/7 E |
| 5,111,093 | 5/1992 | Tanaka | 310/88 |

*Primary Examiner*—David S. Martin
*Attorney, Agent, or Firm*—Mark P. Calcaterra

[57] ABSTRACT

In a starter control system for an engine equipped with a starter motor, starter relay, ignition switch, and electronic control unit (ECU), a circuit and method whereby the ECU will deactivate the starter relay if the operator of a vehicle attempts to re-start the vehicle when the current engine speed is greater than the minimum engine running speed, under both initial starting and engine running conditions. The deactivation of the starter relay will prevent engagement of the pinion gear to the ring gear of the starter motor, potentially reducing wear on the starter motor, grinding of the pinion gear to the ring gear when engaging the gears at a high RPM, and noise to an operator of the vehicle.

10 Claims, 4 Drawing Sheets

STARTER MOTOR CONTROL CIRCUIT AND METHOD

CROSS REFERENCE TO RELATED APPLICATION(S)

The present application is a continuation of U.S. Ser. No. 08/531,569 filed Sep. 5, 1995, which is a continuation of U.S. Ser. No. 08/270,344, filed Jul. 5, 1994, now abandoned.

BACKGROUND OF THE INVENTION

1. Field of the Invention

The present invention generally relates to starting mechanisms of vehicles and, more particularly, to control of the starter motor of a vehicle after the vehicle is running.

2. Description of the Related Art

Typically, a vehicle engine has a starter motor which is activated through a relay when the start ignition switch is engaged. Generally, ignition switches enable the deliverance of electrical power to energize the starter relay if the vehicle ignition switch is turned on. Upon the occurrence of such an event, the starter relay will be responsible for transmitting power to the starter motor. The starter motor will then provide transitional and rotational movement to a starter pinion gear which then meshingly engages a ring gear of an engine crankshaft.

Current starting systems of vehicles do not fully disengage the starter motor after start-up. Hence, the starter motor can engage the pinion gear to the ring gear of the engine even after the vehicle is running. Recent advances in engine vibration reduction, knock control, and exhaust systems have reduced the amount of noise vehicles make when they are running. As a result, inadvertent starts are often caused by vehicle operators since they are unable to ascertain whether the engine is running. Upon such an occurrence, meshing of the pinion and ring gears may result. Therefore, wear may be imparted on the gears. In addition, such engagement may result in unnecessary noise to the vehicle operator.

Furthermore, most manual transmission systems have an over-running clutch in the starter motor to disengage the pinion gear from the ring gear. In such vehicles, it is desirous to bring the speed of the non-rotating pinion gear up to the speed of the rotating gear as quickly as possible when the engine is started and running to prevent damage to the pinion gear. This type of clutch system has a disadvantage that the pinion gear continues to be rotated at high speed by the engine-driven ring gear as long as the operator continues to run the starter motor by keeping the ignition switch in the "start" position. As a result, such a system will not be of use when a vehicle operator inadvertently re-starts the vehicle with prolonged engagement of the clutch since the pinion and ring gears will not disengage. Furthermore, prolonged engagement between the pinion gear and ring gear when the ignition is in the "start" position and the engine has failed to start, may also result in abrasive wear on the gears.

SUMMARY OF THE INVENTION

Accordingly, the present invention provides for a starter control system. More particularly, electronic circuitry and a method of controlling a starter relay for an engine that is equipped with starter, starter relay, ignition switch, and Electronic Control Unit (ECU). The present starter control system will deactivate the starter relay if the operator of a vehicle attempts to re-start the vehicle when the engine speed is greater than a minimum RPM speed, under both engine and running conditions. The deactivation of the starter relay will thereby prevent engagement of the pinion gear to the ring gear of the starter, potentially reducing wear on the starter and "milling" (i.e. grinding of the pinion gear to the ring gear when engaging the gears at a high RPM) noise which may be imparted to the operator of the vehicle.

It is, therefore, one object of the present invention to provide a method of controlling a starter relay through an ECU for an engine of a vehicle.

Another object of the present invention is to disable the engaging capabilities of the pinion gear to the ring gear once the engine is running via the starter relay. In addition, the disclosed method and circuit disables the engaging capabilities of the pinion gear to the ring gear after the ignition switch has been in the "start" position for a prolonged period if the engine has not started by controlling the operation of the starter motor.

To achieve the forgoing objects, the present invention is an apparatus and method of controlling the starter motor for an engine of a vehicle. The method includes the steps of determining if the vehicle meets the required starting conditions. The method also includes calculating the required engine RPM for starting under calculated temperature. The method further includes determining whether the given engine RPM is greater than the calculated target RPM for engine starting.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
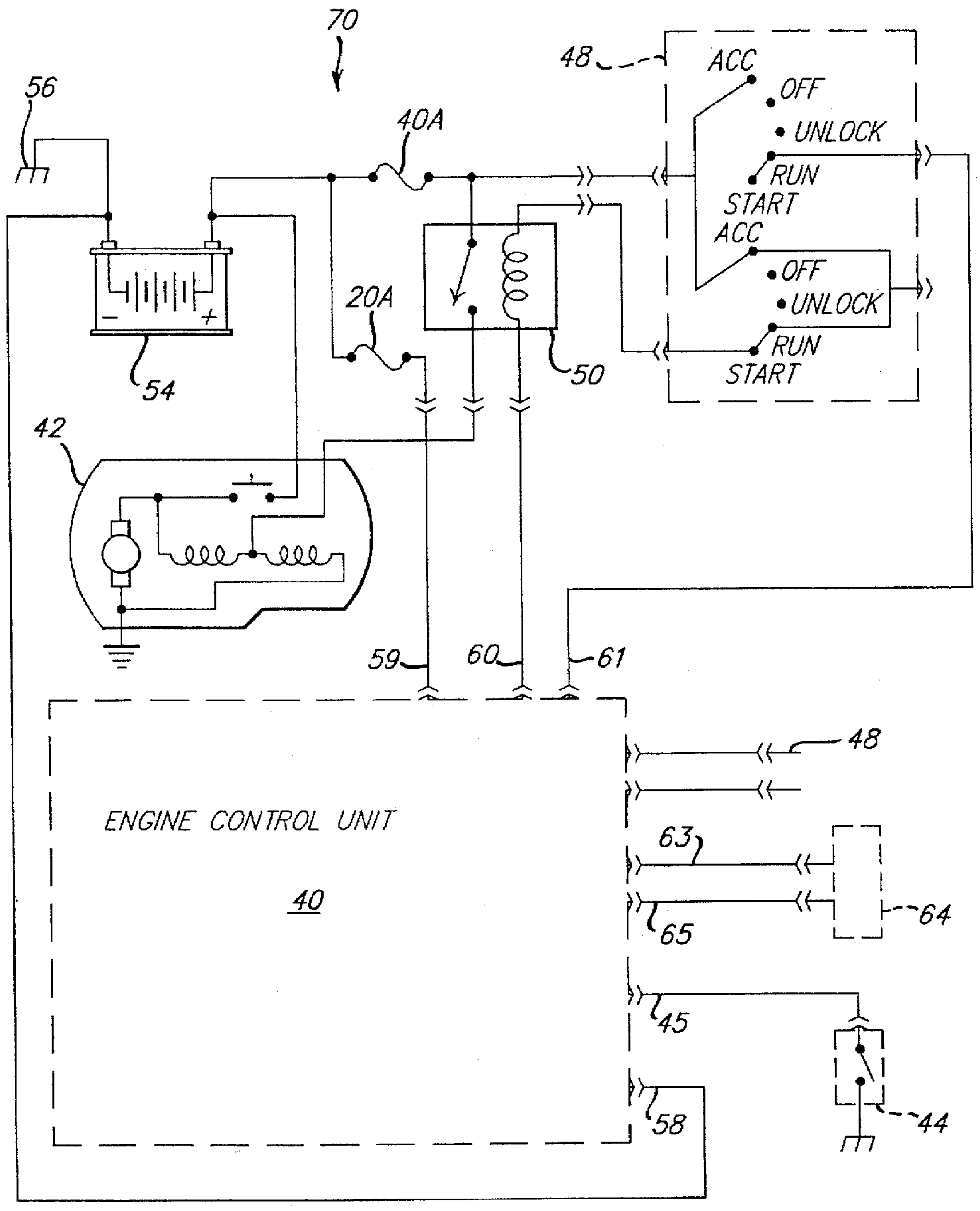
FIG. 1 is a schematic view of an automatic transmission starter control system incorporating the present invention.

Referring now to FIG. 1, a schematic view of a particular embodiment of the present invention for a starter control system 70 is shown. Such an embodiment, as shown in FIG. 1, is for an automatic transmission vehicle (not shown). The control system 70 includes an engine controller or Electronic Control Unit (ECU) 40. The ECU 40 includes a microprocessor, memory (volatile and non-volatile), bus lines (address, control, and data), and other hardware and software needed to perform the task of engine control. The starter control system 70 also includes a crankshaft sensor 64 interconnected to the ECU 40 and internal combustion engine to measure the rotational speed and angular position of the crankshaft (not shown). The control system 70 further includes a transmission gear state switch wherein the switch is a park/neutral switch 44, in the automatic transmission embodiment and a clutch interlock switch 52 in the manual transmission embodiment. The park/neutral switch 44 is interconnected to the ECU 40 and the vehicle transmission. The park/neutral switch 44 is fed into the ECU 40 at the park/neutral signal lead 45. The park/neutral switch 44 is in a closed or conducting position if the vehicle transmission is in a "park" or "neutral" state.

The control system 70 also includes a power ground line 58, for grounding the ECU 40, fed from the engine ground terminal 56 of the battery 54 to the ECU 40. Moreover, the control system 70 includes data input and output lines provided by a body controller bus 48 to the ECU 40 and also connected to the ignition switch 46. The controller bus 48 is for notifying the ECU 40 if the vehicle operator is attempting to start the engine. The starter relay control system 70 also includes a battery feed 59 connected to the ECU 40 and the battery 54. The battery feed 59 provides voltage to the ECU 40 from the positive terminal of the battery 54. Moreover, the control system 70 provides for an ignition feed 61 connected between the ECU 40 and the ignition switch 46. The ignition feed 61 provides a voltage signal to the ECU 40 upon placement of the ignition switch 46 in a "start" position by a vehicle operator. In the preferred embodiment, the control system 70 further provides starter relay control signal means 60 connected between the ECU 40 and a starter relay 50. Through the relay control signal means 60, the ECU 40 can provide a ground path such that current will conduct through and energize the coil of the starter relay 50. It is to be understood, however, that other circuit components could be used in place of the starter relay 50, such as a power or MOSFET transistor, that could be controlled by the ECU 40 to provide relay power throughout the control system 70.

The current starter relay control system 70 also includes an ignition switch 46 connected to the starter relay 50, vehicle battery 54 via a forty (40) amp fuse, ignition feed 61 of the ECU 40, and bus controller 48. The ignition switch 46 is turned to various positions by a vehicle operator. Typical vehicle ignition switches provide an "off" position for disabling all mechanical and electrical means, an "unlock" position for enabling select electrical circuitry to operate such as a radio and power windows, a "run" position which the ignition switch stays in while the vehicle is running, and a "start" position for enabling the vehicle to begin start-up operations. The present starter relay control system 70 also includes a starter relay 50. The starter relay 50 is connected to the ECU 40, starter relay control 60, starter motor 42, battery 54, and ignition switch 46. The starter relay 50 provides means for energizing and de-energizing the starter motor 42 by providing and denying current flow to the starter motor 42. The starter relay control system 70 further includes a vehicle battery 54 with positive and negative terminals. The negative terminal is connected to engine ground 56, while the positive terminal is connected to the starter motor 42, ECU 40, battery feed 59 via a twenty (20) amp fuse 20A, and the ignition switch 46 via a forty (40) amp fuse 40A.

Referring now to circuit operation of the present invention, under normal operating conditions, the vehicle transaxle must be in "park" or "neutral" for automatic transmission vehicles to start the engine 75. The ECU 40 monitors if the transmission is in the proper gear for engine starting by sensing the park/neutral switch 44 at the park/neutral signal lead 45. With the ignition key in the ignition switch 46, the ignition switch 46 is turned to the "start" position. The body controller 48 transmits a signal to the ECU 40 if the operator of the vehicle is starting the engine (i.e. "cranking"). If the engine is not running by determination of the current RPM versus the calculated RPM in the starter relay methodology stated infra, the ECU 40 provides a ground path for the starter relay 50. This results in the engagement of the starter motor 42. If the engine is running, the ECU 40 does not provide a ground path to energize the starter relay 50, which in turn does not engage the starter motor 42.

Figure 2:
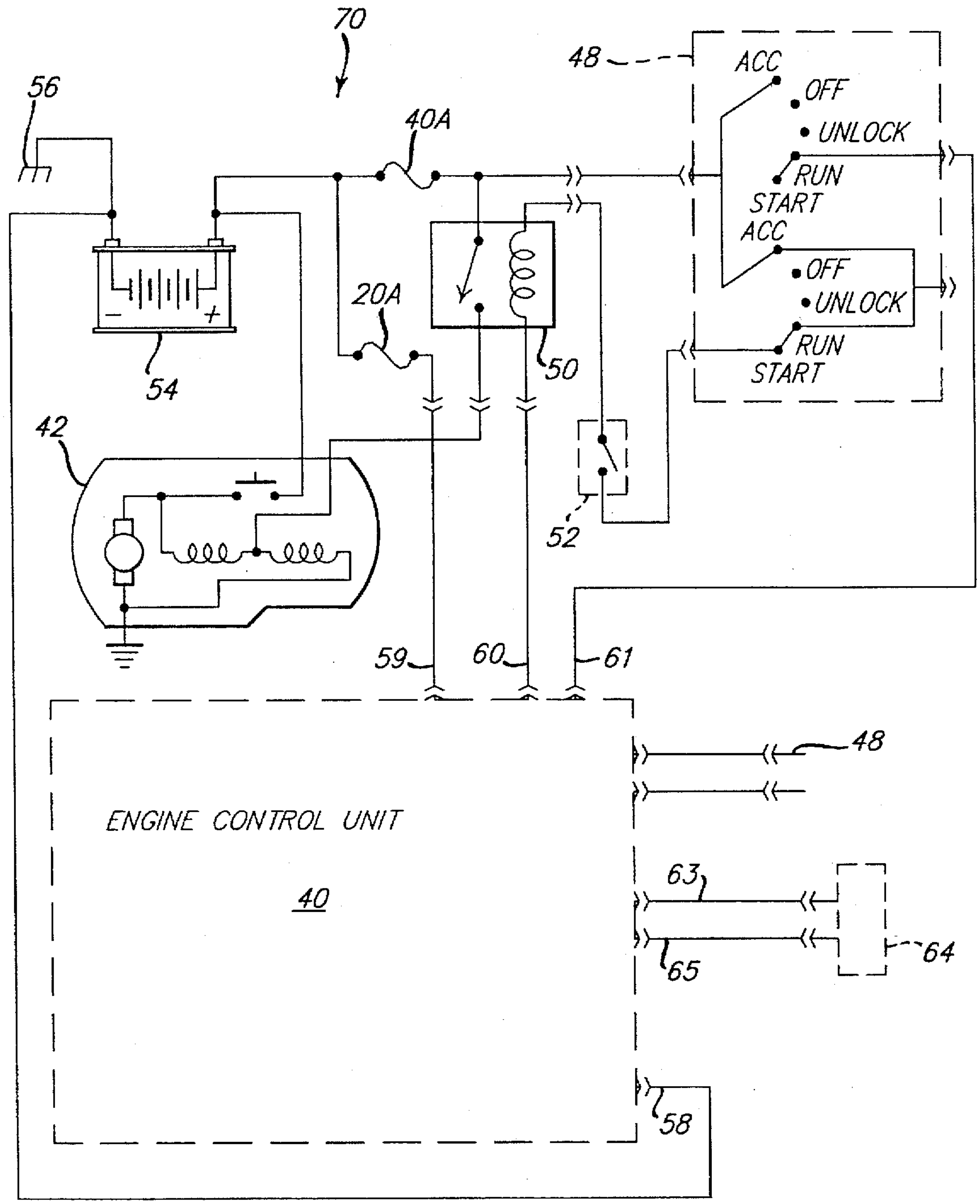
FIG. 2 is a schematic view of a manual transmission starter control system incorporating the present invention.

Referring now to FIG. 2, a schematic view of a particular embodiment of the present invention for the starter relay control system 70 is shown. Such an embodiment, as shown in FIG. 2, is applicable to a manual transmission vehicle (not shown). The starter relay control system 70 includes an engine controller or Electronic Control Unit (ECU) 40. The ECU 40 includes a microprocessor, memory (volatile and non-volatile), bus lines (address, control, and data), and other hardware and software needed to perform the task of engine control. The starter relay control system 70 also includes a crankshaft sensor 64 interconnected to the ECU 40 and internal combustion engine to measure the rotational speed and angular position of the crankshaft (not shown) whereby the ECU 40 can determine the engine RPM. The crankshaft sensor 46 is fed to the ECU 40 via crank signal lead 63. Moreover, the ECU 40 can return signals to the crankshaft sensor 64 via the sensor return lead 65. It is to be expressly understood that a plurality of sensors can be used in the present invention to provide signals to the ECU 40 and whereby the ECU 40 can then determine the engine RPM.

The control system 70 further includes a clutch interlock switch 52, in the manual transmission embodiment, interconnected to the start relay 50 and the vehicle ignition switch 46. The clutch interlock switch 52 will be placed in a closed or conducting position if the vehicle clutch is depressed by the operator. The starter relay control system 70 also includes a power ground line 58, for grounding the ECU 40, fed from the engine ground terminal 56 of the battery 54 to the ECU 40. Moreover, the starter relay control system 70 includes data input and output lines provide by a body controller bus 48 to the ECU 40 and also connected to the ignition switch 46. The body controller bus 48 is for notifying the ECU 40 if the vehicle operator is attempting to start the engine.

The starter relay control system 70 also includes a battery feed 59 connected to the ECU 40 and the battery 54. The battery feed 59 provides voltage to the ECU 40 from the positive terminal of the battery 54. Moreover, the starter relay control system 70 provides for an ignition feed 61 connected between the ECU 40 and the ignition switch 46. The ignition feed 61 provides a voltage signal to the ECU 40 upon placement of the ignition switch 46 in a "start" position by a vehicle operator. The starter relay control system 70 further provides starter relay control signal means 60 connected between the ECU 40 and the starter relay 50. Through the starter relay control signal means 60, the ECU 40 can provide a ground path such that current will conduct through and energize the coil of the starter relay 50.

The current starter relay control system 70 also includes an ignition switch 46 connected to the starter relay 50, vehicle battery 54, ignition feed 61 of the ECU 40, and bus controller 48. The ignition switch 46 is turned to various positions by a vehicle operator. Typical vehicle ignition switches provide an "off" position for disabling all mechanical and electrical means, an "unlock" position for enabling select electrical circuitry to operate such as a radio and power windows, a "run" position which the ignition switch stays in while the vehicle is running, and a "start" position for enabling the vehicle to start. The present starter relay control system 70 also includes a starter relay 50. The starter relay 50 is connected to the ECU 40, starter relay control signal means 60, starter motor 42, battery 54, and ignition switch 46. The starter relay 50 provides means for energizing and de-energizing the starter motor 42 by providing and denying current flow to the starter motor 42. The starter relay control system 70 further includes a vehicle battery 54 with positive and negative terminals. The negative terminal is connected to engine ground 56, while the positive terminal is connected to the starter motor 42, ECU 40, battery feed 59, and the ignition switch 46.

Under normal operating conditions, the vehicle clutch must be depressed in manual transmission vehicles to start the engine (not shown). If the clutch is not in a depressed position, the starter relay 50 will not be able to energize since an open circuit is created and current will not be able to conduct through the relay coil. With the ignition key in the ignition switch 46 the ignition switch 46 is turned to the start position. The body controller 48 transmits a signal to the ECU 40 if the operator of the vehicle is starting the engine (i.e. "cranking"). If the engine is not running by determination of the current RPM versus the calculated RPM in the starter relay methodology stated infra, the ECU 40 provides a ground path for the starter relay 50. If the clutch is also depressed, current will be conducted through the starter relay coil to the ground path created at the starter relay control signal means 60 of the ECU40. This will result in the engagement of the starter motor 42 causing it to operate. If the engine is running, the ECU 40 does not provide a ground path to energize the starter relay 50, which in turn does not engage the starter motor 42.

Figure 4:
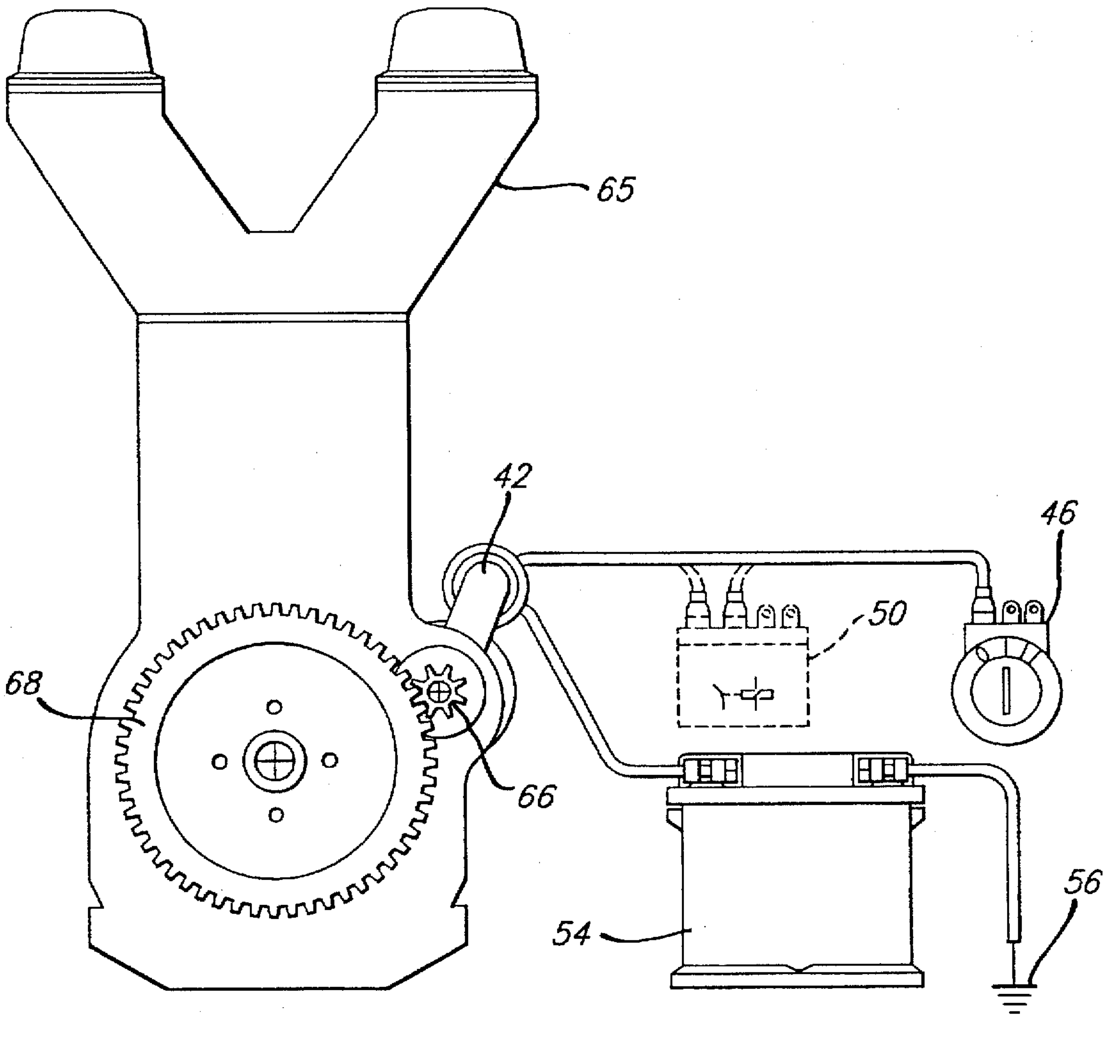
FIG. 4 is a partial schematic, partial frontal view of an engine block and relative engine components of the present invention.

Referring to FIG. 4, a partial frontal view and partial schematic view of an engine block 75 is shown. The engine block 75 has a ring gear 68 rotationally engaged to one or more parts for imparting motion to the engine crankshaft (not shown). The ring gear 68 is positioned such that it can be in rotationally meshing engagement with a pinion gear 66. The pinion gear 66 is rotationally connected to the starter motor 42 which imparts motion to the pinion gear 66. The rotation of the pinion gear 66 moves the gear teeth into alignment with the engine ring gear 68 to provide for meshing engagement of the pinion gear 66 to the ring gear 68. The starter motor 42 has electrical connections supplied from the starter relay 50, ignition switch 46, and vehicle battery 54 for providing current and voltage to the starter motor 42. The vehicle battery 54 has a positive lead connected to the starter motor 42 and a ground lead connected to engine ground 56. FIG. 4 also shows a view of the starter relay 50. The starter relay 50 is electrically connected to the starter motor 42 and the ignition switch 46. The starter relay 50 provides the relay of power to the starter motor 42. Further shown in FIG. 4 is the ignition switch 46 which is electrically connected to the starter relay 50 and provides input from the vehicle operator.

Figure 3:
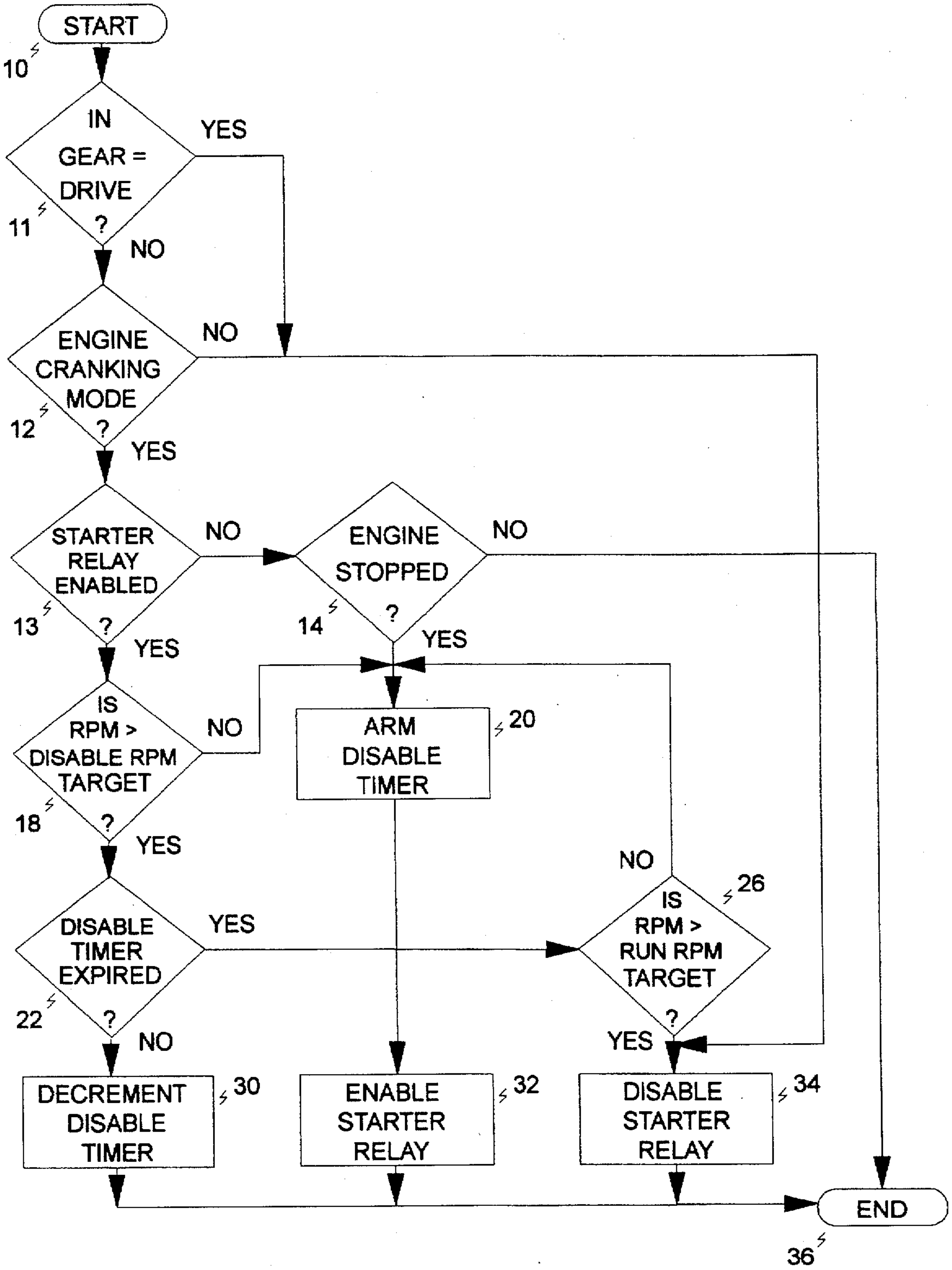
FIG. 3 is a flowchart of a method of controlling the starter relay through the ECU according to the present invention.

Referring now to FIG. 3, a flowchart of a method for controlling the starter relay 50 of a vehicle through the electronic control unit (ECU) 40, is shown. The methodology begins at bubble 10. To initiate the starter relay control routine in the ECU 40, the occurrence of a run-start reference signal from the ignition switch 46 is received and the method falls through to decision block 11. At decision block 11, the methodology determines whether a neutral safety switch flag has been set in the ECU 40 which denotes that the vehicle gear is in drive. If the vehicle is in drive gear, the methodology will then proceed to block 34 and disable the starter relay 50. If, however, the neutral safety switch flag has not been set, denoting that the vehicle is not in drive gear, the methodology falls through to decision block 12.

In decision block 12, the methodology determines if the operator of the vehicle is attempting to start the engine. This is determined by the ECU 40 receiving a signal from the body controller 48, on the status of the ignition switch 46. If the operator is not attempting to start the engine, the methodology proceeds to block 34 and disables the starter relay 50. If, however, the operator of the vehicle is attempting to start the engine by engaging the ignition switch 46, the methodology enters decision block 13.

In decision block 13, the methodology determines if the starter relay 50 is enabled by the ECU 40. If the starter relay 50 is enabled, the methodology then falls through to decision block 18. If the starter relay 50 is not disabled, the methodology proceeds to decision block 14 and determines if the engine has stopped. If the engine has stopped running, the methodology will fall through to block 20 where a disable timer of the ECU 40 will be armed. If, however, it is determined in decision block 14 that the engine has not stopped, the methodology will advance to bubble 36. In bubble 36, the methodology returns from the starter relay control routine of the ECU 40.

Returning now to decision block 13, if the methodology determines that the starter relay is enabled, the methodology falls through to decision block 18. In decision block 18, the methodology determines if the current engine revolutions per minute (RPM) is greater than a calculated disable RPM. The calculated disable RPM is the minimum RPM at the current temperature, determined by the ECU 40, at which the engine is running. If the current RPM is greater than the calculated disable RPM, the methodology proceeds to decision block 22. If, however, the current RPM is not greater than the calculated disable RPM, the methodology proceeds to block 20.

In block 20, the methodology sets the disable delay timer of the ECU 40. The disable delay timer is activated to provide sufficient time for the engine to transfer from start to run mode, including rough idle conditions. The methodology then falls through to block 32 and enables the starter relay 50. The methodology then continues to bubble 36. In bubble 36, the methodology returns from the starter relay control routine.

Returning now to decision block 22, the methodology checks if the disable delay timer has expired. If the disable delay timer has expired, the methodology proceeds to decision block 26. If, however, the disable delay timer has not expired, the methodology falls through to block 30. At block 30, the methodology decrements the disable delay timer. The methodology then continues through to bubble 36. In bubble 36, the methodology is returned from the starter relay control routine.

If the timer has not been disabled in decision block 22, the methodology advances to decision block 26. In decision block 26, the methodology determines if the current engine RPM is greater than the calculated RPM. The calculated disable RPM is the minimum RPM at the current temperature, determined by the ECU 40, at which the engine is running. If the actual RPM is greater than the calculated disable RPM, the methodology falls through to block 34. If, however, the actual RPM is not greater than the calculated disable RPM, meaning that the engine had not sustained the required RPM after the disable delay timer has expired, the methodology proceeds to block 20 to arm the disable timer.

If the actual engine RPM is greater than the calculated disable RPM, the methodology falls through to block 34. In block 34, the methodology disables the starter relay 50. This is accomplished by the ECU 40 withholding the transmittance of a voltage signal to the starter relay 50 such that the starter relay 50 is not energized. The methodology then continues through to bubble 36. In bubble 36, the methodology is returned from the starter relay control routine.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. In a starter relay control circuit of a vehicle, the vehicle having an automatic transmission with a "park" position and a "neutral" position, the starter relay control circuit including a battery for providing power to the starter relay control circuit, a starter motor for providing transfer power to a vehicle engine in electrically operable relation with the battery, and an ignition switch for receiving input from a vehicle operator in electrically operable relation with the starter motor and battery, the starter relay control circuit comprising:

means for relaying power to the starter motor, the means for relaying power having input and output terminals, the means for relaying power having input terminals in electrically operable relation with the ignition switch and the output terminals in electrically operable relation with the starter motor;

means for controlling the starter motor by creating an open circuit across leads of the starter motor when the engine is running and the ignition switch is engaged in an engine "start" position, the starter motor having input terminals, the starter motor input terminals in electrically operable relation with the means for relaying power;

an Electronic Control Unit (ECU) for energizing and de-energizing the means for relaying power, the ECU including a microprocessor, memory capabilities, at least one bus line, and input and output terminals in electrically operable relation with the means for relaying power; and a transmission state switch in electrically operable relation with the ECU and having a conducting closed position and an open position, the transmission state switch only being in the conducting closed position when the transmission is in the "park" position and when the transmission is in the "neutral" position.

2. The starter relay control circuit of claim 1 wherein the means for relaying power comprises a starter relay.

3. The starter relay control circuit of claim 2 wherein the means for controlling the starter motor comprises the Electronic Control Unit (ECU).

4. In a starter relay control circuit of a vehicle, the vehicle having a manual transmission with a clutch having an interlocked position, the starter relay control circuit including a battery for providing power to the starter relay control circuit, a starter motor for providing transfer power to a vehicle engine in electrically operable relation with the battery, and an ignition switch for receiving input from a vehicle operator in electrically operable relation with the starter motor and battery, the ignition switch having an engine "start" position, the starter relay control circuit comprising:

means for relaying power to the starter motor, the means for relaying power having input and output terminals, the means for relaying power having input terminals in electrically operable relation with the ignition switch and the output terminals in electrically operable relation with the starter motor;

a transmissions state switch in electrically operable relation with the means for relaying power and having a conducting closed position and an open position, the transmission state switch only being in the conducting closed position when the clutch is in the interlocked position;

means for controlling the starter motor by creating an open circuit across the leads of the starter motor when the engine is running and the ignition switch is engaged in the engine "start" position, the starter motor having input terminals, the starter motor input terminal in electrically operable relation with the means for relaying power; and an engine shaft sensor for imparting an angular position signal representation of engine revolution speed to the starter relay control circuit, the engine shaft sensor in electrically operable relation with the means for controlling the starter motor.

5. The starter relay control circuit of claim 4 wherein the means for relaying power comprises a starter relay.

6. The starter relay control circuit of claim 5 wherein the means for controlling the starter motor comprises an Electronic Control Unit (ECU) for energizing and de-energizing the means for relaying power, the ECU included a microprocessor, memory capabilities, bus lines, and having input and output terminals in electrically operable relation with the means for relaying power.

7. The starter relay control circuit of claims 6 wherein the engine shaft sensor is a crankshaft sensor.

8. The starter relay control circuit of claim 6 wherein the engine shaft sensor is a camshaft sensor.

9. In a starter relay control circuit and associated control system for a vehicle, the vehicle having an automatic transmission with a "park" position and a "neutral" position, the starter relay control circuit including a battery, a starter motor having input leads, the starter motor input leads in electrically operable relation with the battery, an ignition switch in electrically operable relation with the starter motor and battery, the ignition switch having an engine "start" position, a starter relay in electrically operable relation with the starter motor, ignition switch, and vehicle battery, an Electronic Control Unit (ECU) in electrically operable relation with at least one relay, the ignition switch, the starter motor, and the vehicle battery, and a transmission gear state switch in electrically operable relation with the ECU and having a conducting closed position and an open position, a starter motor relay control method comprising the steps of:

determining if the transmission gear state switch is in the conducting closed position only when the transmission is in the "park" position and when the transmission is in the "neutral" position; and creating an open circuit across the input leads of the starter motor if the engine is running, the ignition switch is engaged in the "start" position and the transmission gear state switch is operable.

10. In a starter relay control circuit and associated control system for a vehicle, the vehicle including an automatic transmission with a "park" position and a "neutral" position, the starter relay control circuit comprising a battery, a starter motor having input leads, the starter motor input leads in electrically operable relation with the starter motor and battery, the ignition switch having an engine "start" position, at least one starter relay in electrically operable relation with the starter motor, ignition switch, and battery, an Electronic Control Unit (ECU) in electrically operable relation with at least one relay, the ignition switch, the starter motor, and the vehicle battery, and a transmission gear state switch in electrically operable relation with the ECU and having a conducting closed position and an open position, a starter relay control method comprising the steps of:

determining whether the transmission gear state switch is in a conducting closed position only when the transmission is in the "park" position and when the transmission is in the "neutral" position;

determining whether an actual vehicle engine RPM is greater than a target RPM;

arming a disable timer if the actual vehicle engine RPM is less than the target RPM and enabling the starter relay;

determining whether the disable timer has disarmed;

decrementing the disable timer if the disable timer has not disarmed;

determining whether the actual vehicle engine RPM is greater than the target RPM;

arming the disable timer if the actual vehicle engine RPM is less than the target RPM and enabling the starter relay; and disabling the starter relay if the actual vehicle engine RPM is greater than the target RPM.

* * * * *